United States Patent [19]

Eminger

[11] Patent Number: 5,727,595
[45] Date of Patent: Mar. 17, 1998

[54] CHANGEOVER VALVE SYSTEM HAVING A CROSS DRIVE MEMBER

[76] Inventor: Harry E. Eminger, 35 Lime Rock Dr., E. Greenwich, R.I. 02818

[21] Appl. No.: 618,372

[22] Filed: Mar. 19, 1996

Related U.S. Application Data

[63] Continuation-in-part of Ser. No. 370,797, Jan. 10, 1995, Pat. No. 5,549,138.

[51] Int. Cl.$^6$ .................................................. F16K 11/02
[52] U.S. Cl. .................................................. 137/876; 251/86
[58] Field of Search ............................... 137/876; 251/86

[56] References Cited

U.S. PATENT DOCUMENTS

| | | | |
|---|---|---|---|
| 4,403,626 | 9/1983 | Paul, Jr. | 137/876 X |
| 4,475,712 | 10/1984 | De Jager | 251/86 X |
| 4,519,414 | 5/1985 | Anaya | 251/86 X |
| 4,821,772 | 4/1989 | Anderson, Jr. et al. | 137/876 X |
| 5,374,028 | 12/1994 | Newbold | 251/86 |

*Primary Examiner*—John Fox
*Attorney, Agent, or Firm*—Grimes & Battersby

[57] ABSTRACT

A changeover valve system is provided that is adapted to be secured at one end to a riser from a pressurized piping system and at its opposite end to at least two pressure relieving devices. The changeover valve system includes a body and at least two elbows secured to the body to which are attached at least one of the pressure relieving devices. A partially spherical changeover member is provided within the body having at least one inlet port adapted to communicate with the riser and at least one and preferably two outlet ports adapted to alternately communicate with either of the pressure relieving devices. Transport means are provided for effecting rotation of the changeover member within the body to cause the changeover member to travel from one position wherein an outlet port is in communication with one of the pressure relieving devices to a second position wherein an outlet port is in communication with the other pressure relieving device. Locking means are provided for securing the changeover means in either of these two positions. A cross drive member is further provided which includes a top portion having an upper tenon for engaging the means for rotating and a bottom portion having a lower tenon for engaging the changeover member. The longitudinal orientation of the upper tenon is offset by up to about 30 degrees from the perpendicular of the lower tenon.

17 Claims, 9 Drawing Sheets

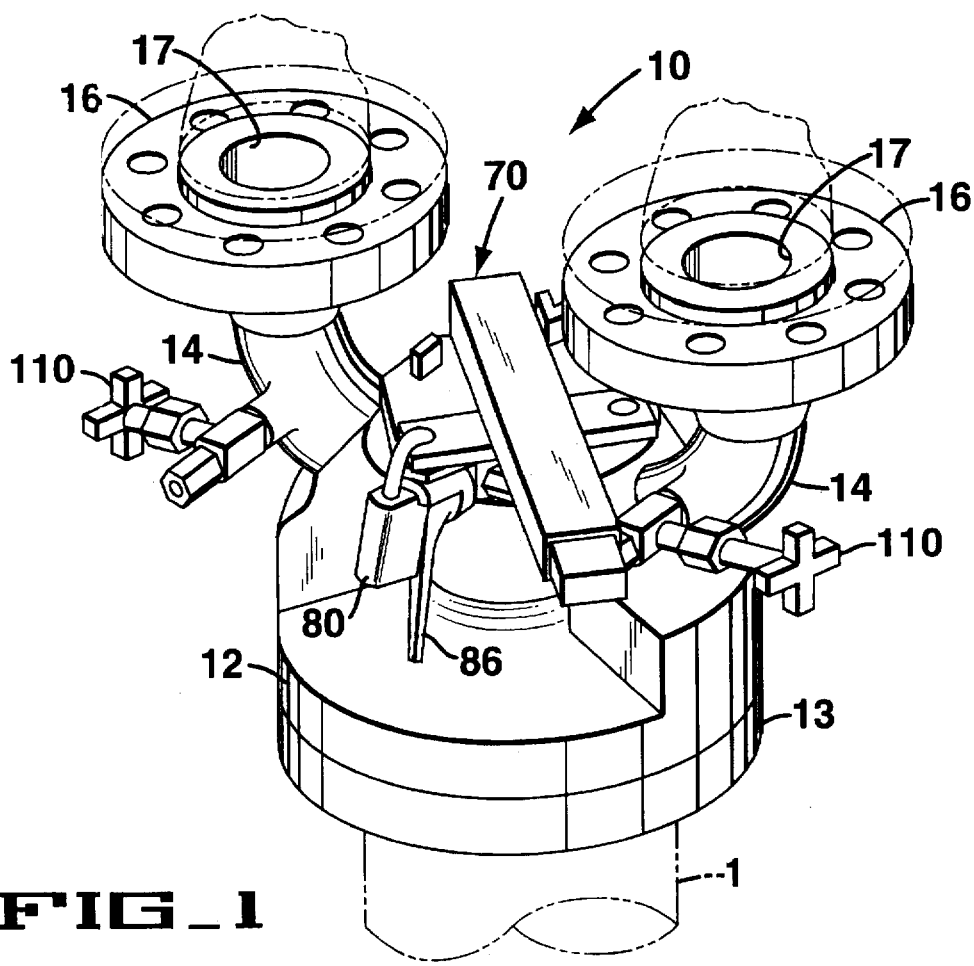
FIG_1
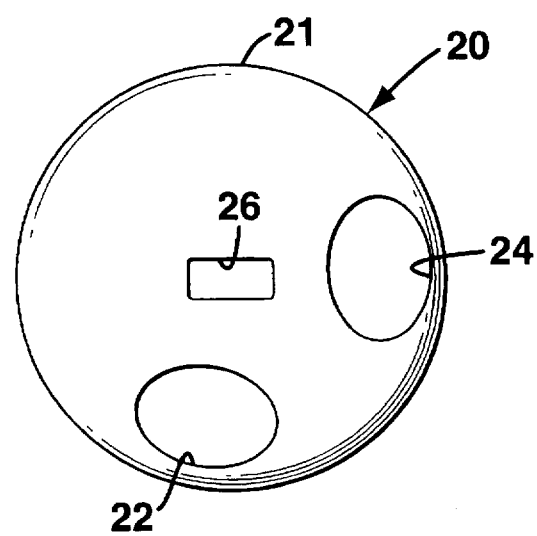
FIG_5

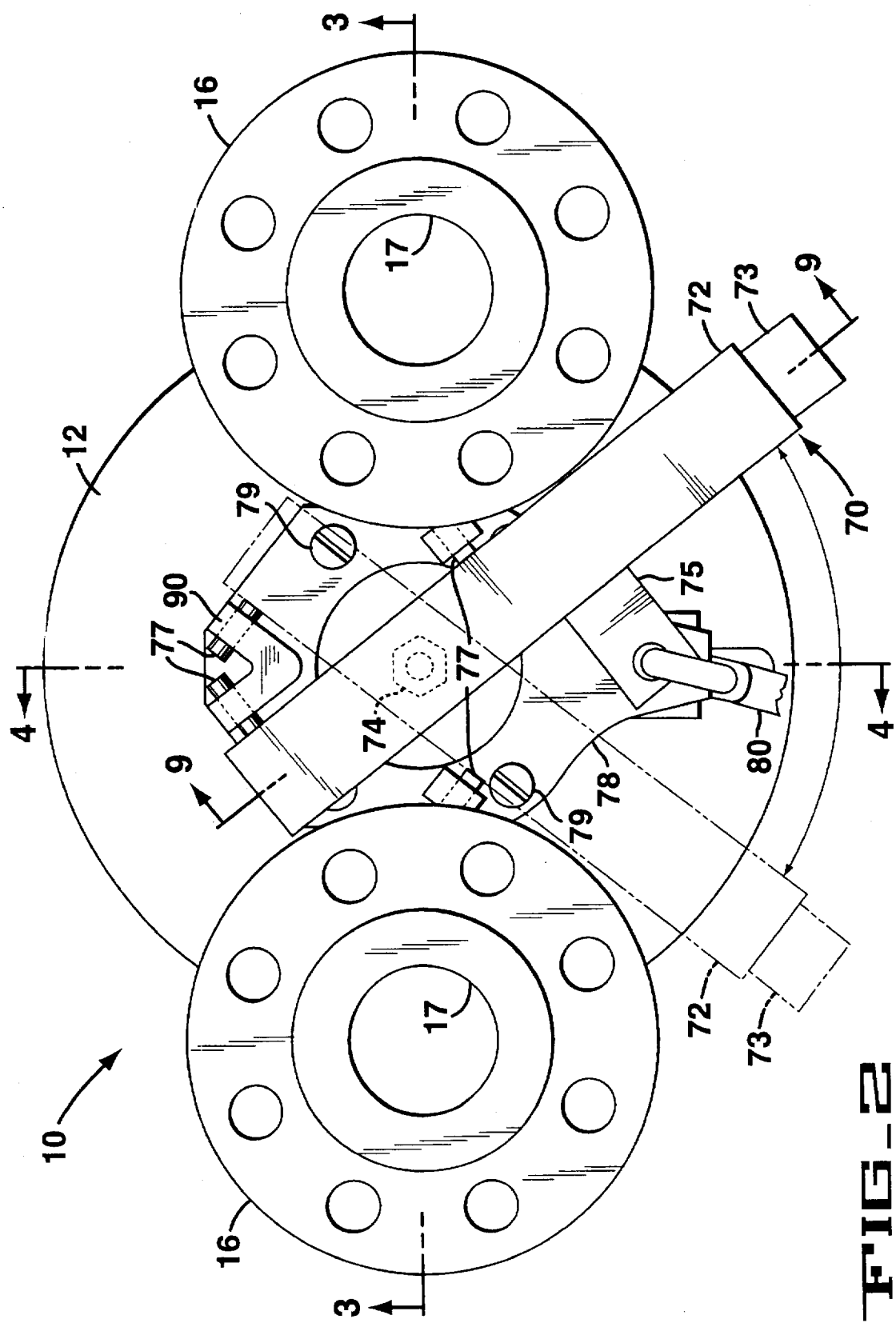

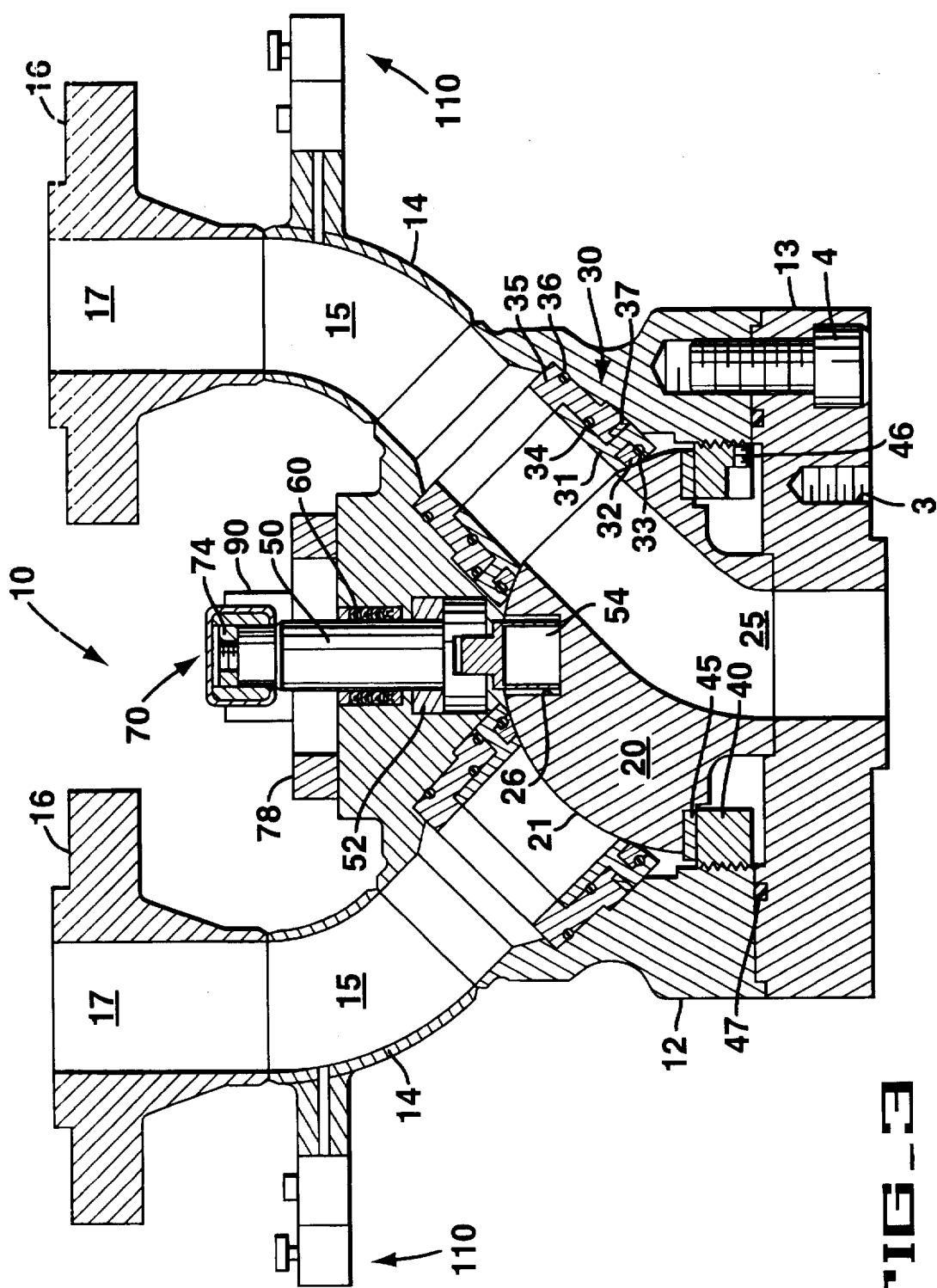
FIG_3

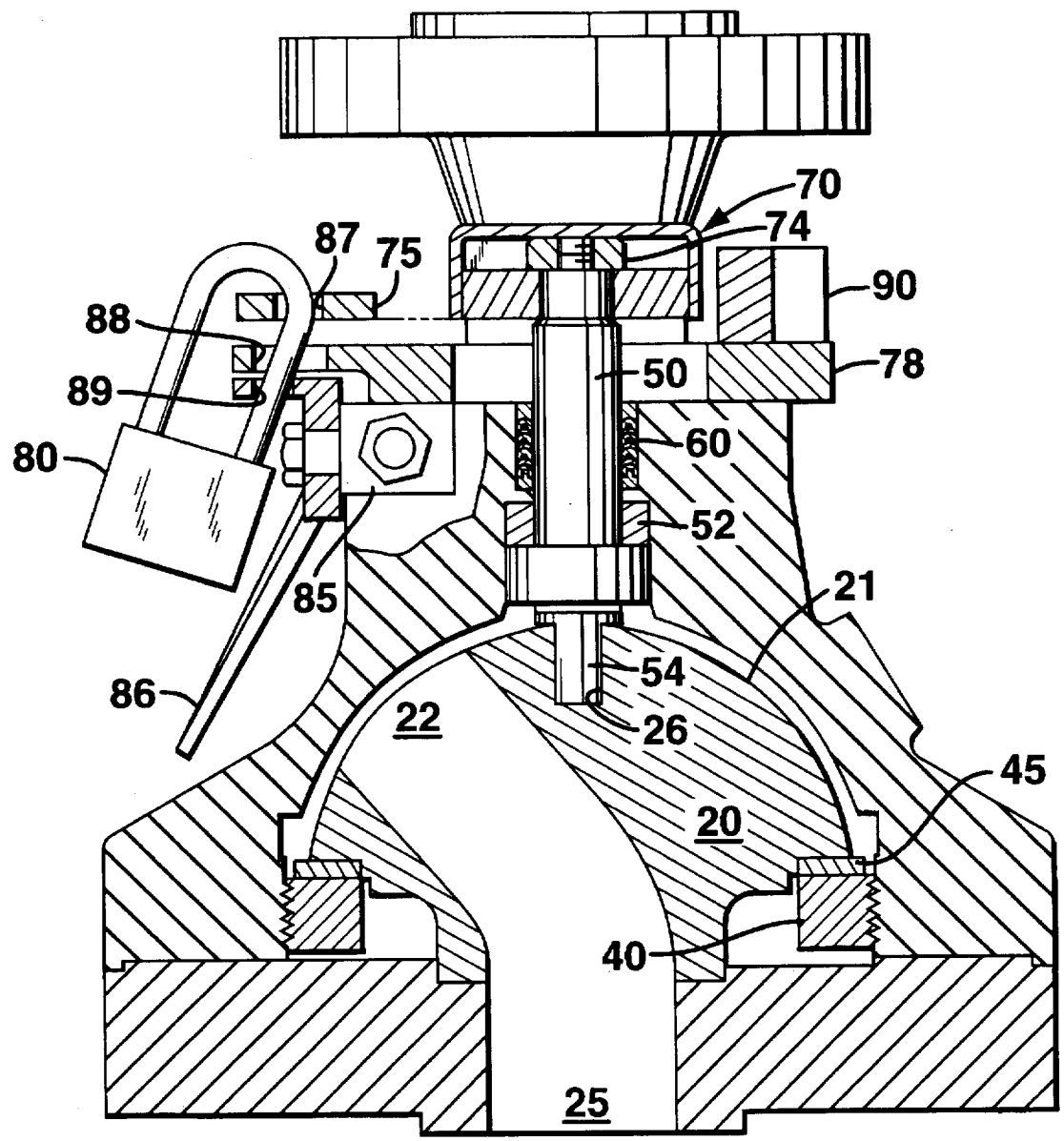
FIG_4

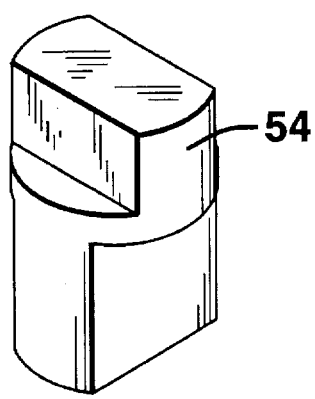
FIG_6
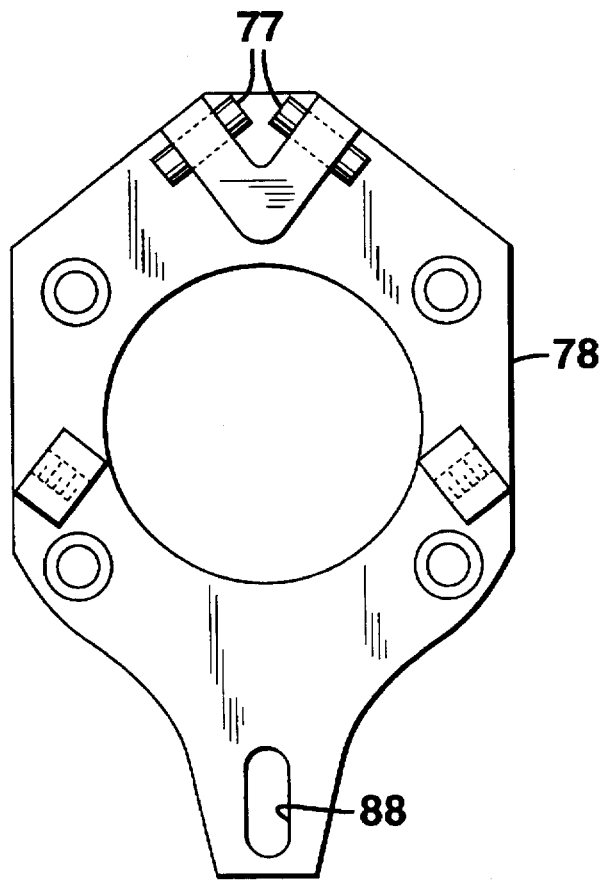
FIG_7
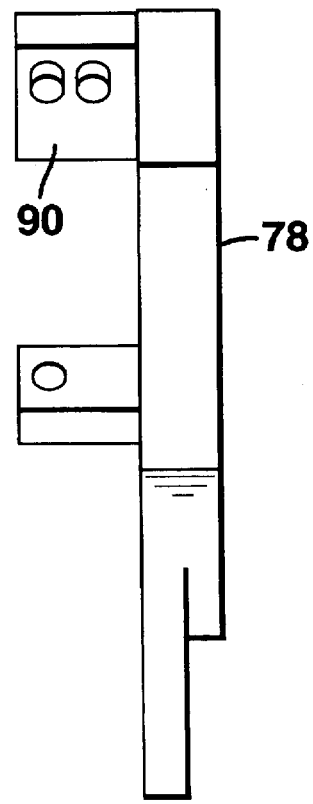
FIG_8

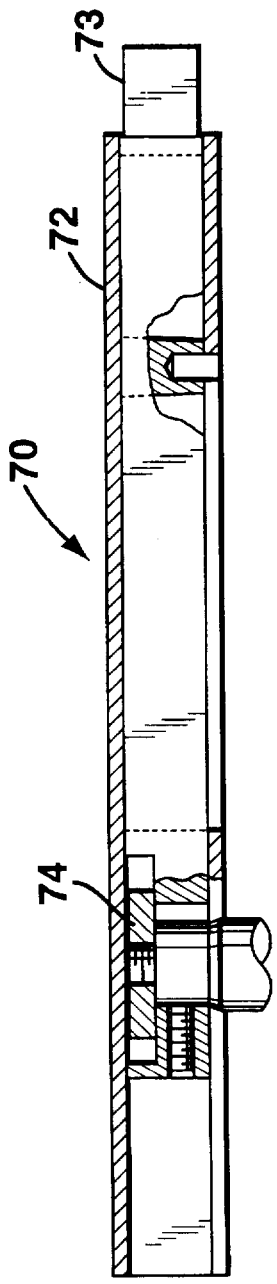
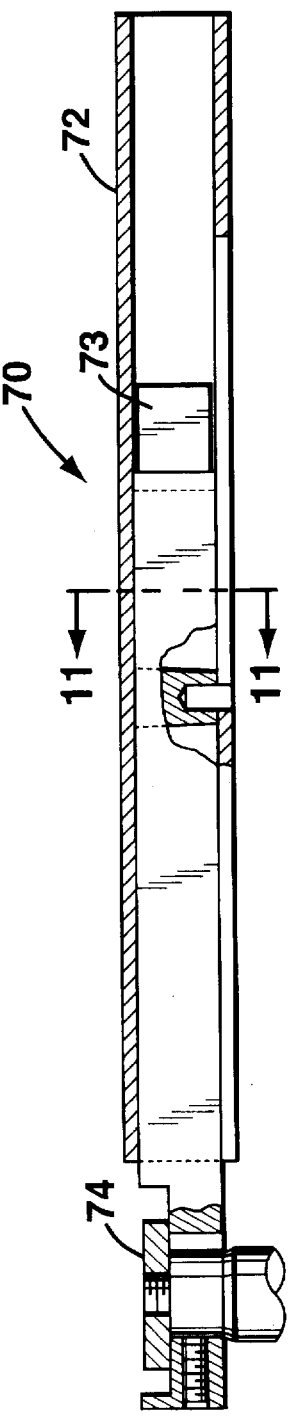
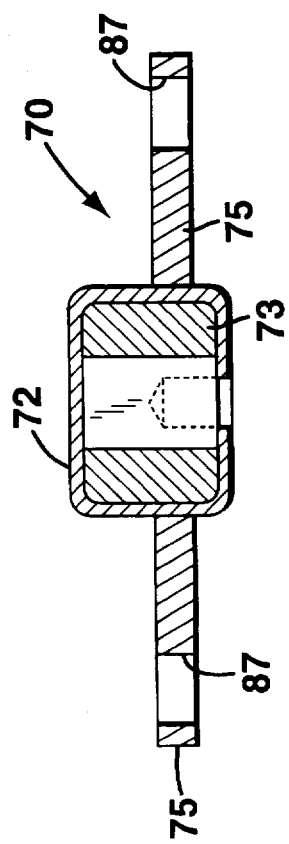

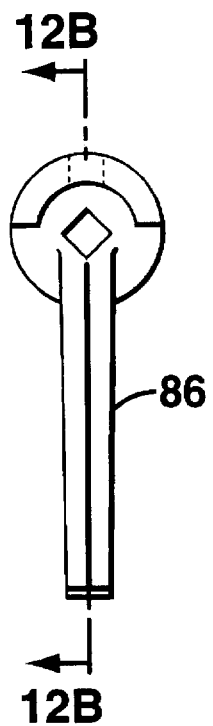
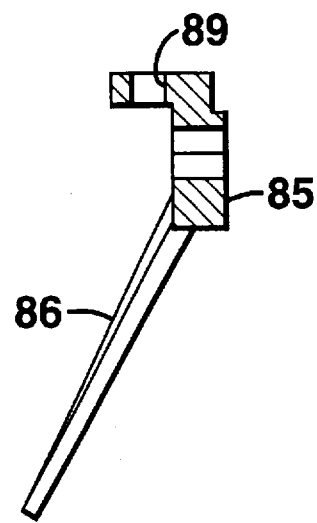
FIG_12A    FIG_12B
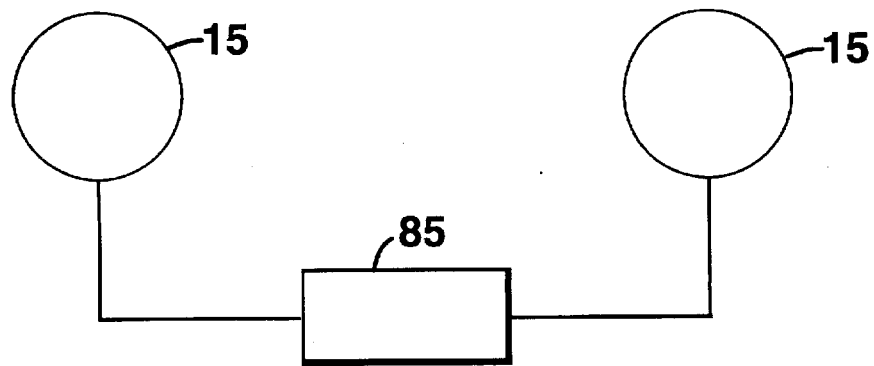
FIG_13

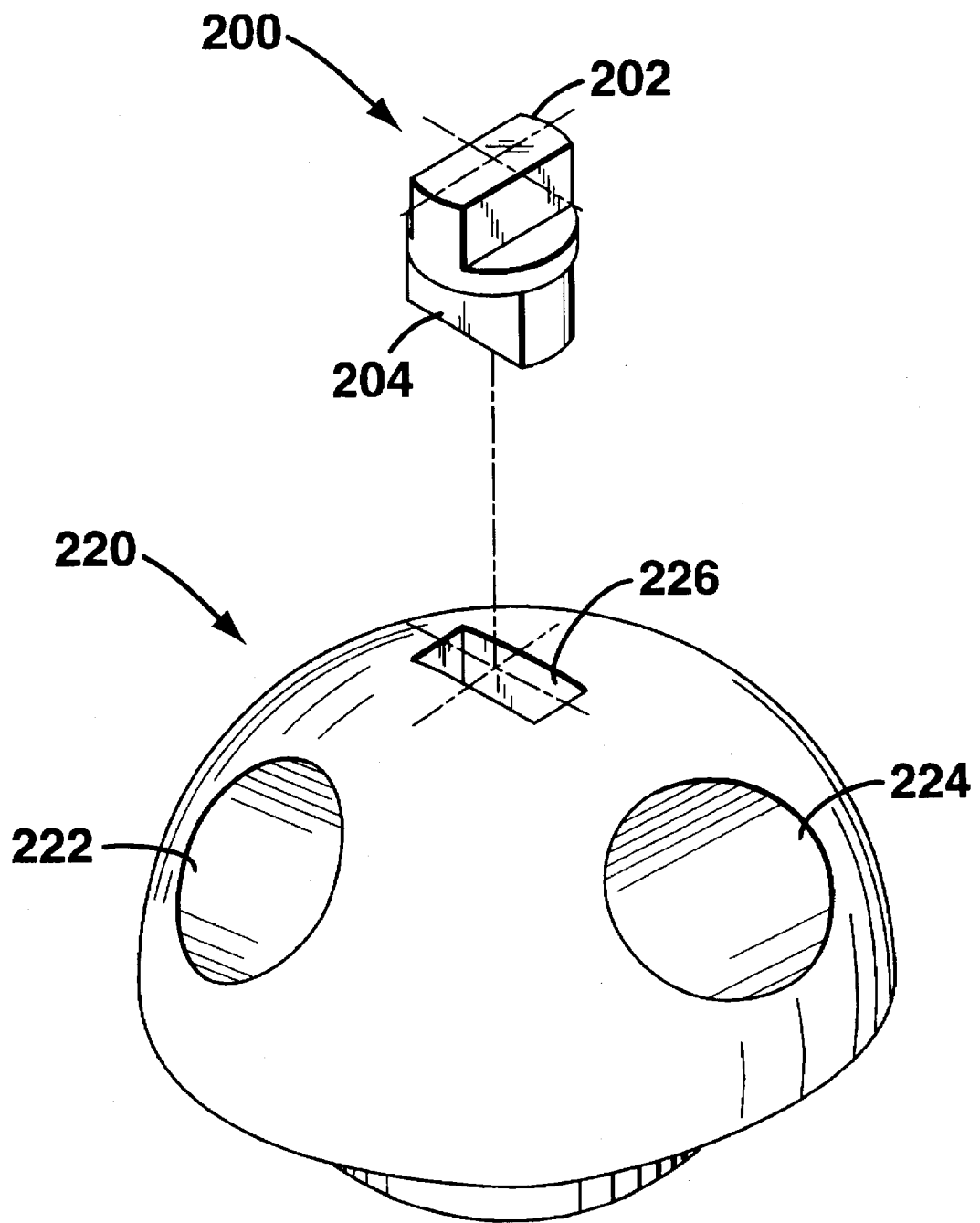
FIG_14

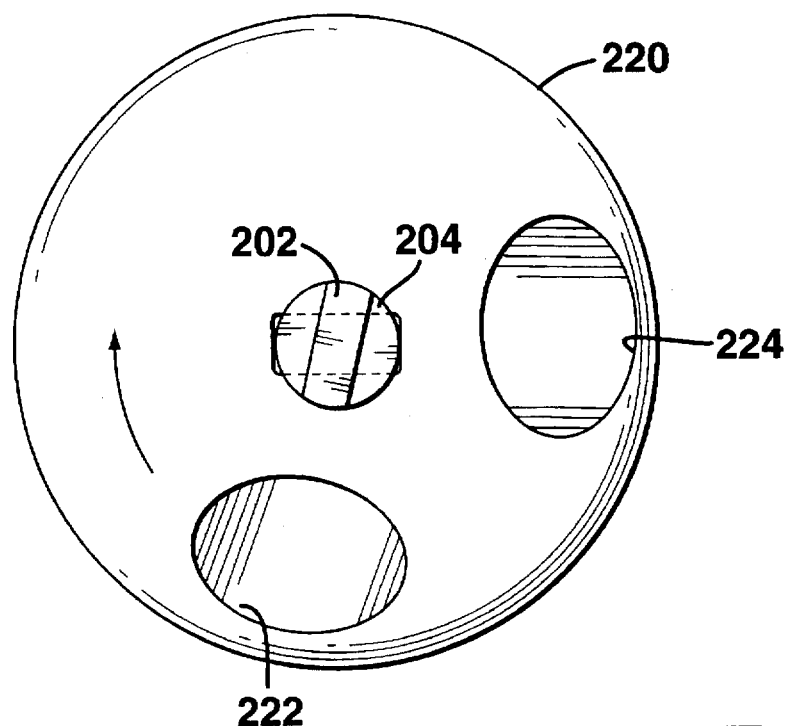
FIG_15
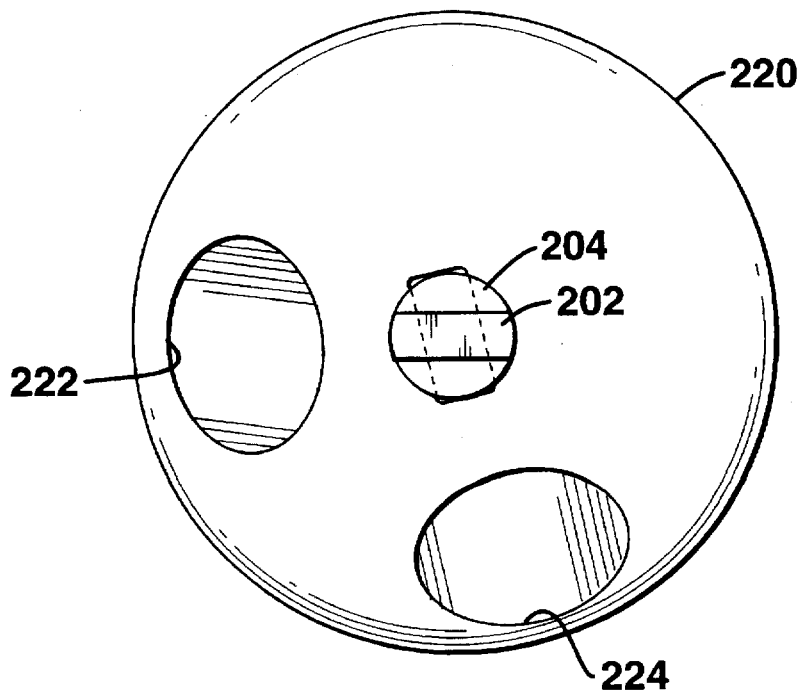
FIG_16

CHANGEOVER VALVE SYSTEM HAVING A CROSS DRIVE MEMBER

This is a continuation in part of U.S. patent application Ser. No. 08/370,797 filed on Jan. 10, 1995 in the name of Harry E. Eminger for Changeover Valve System now U.S. Pat. No. 5,549,138.

BACKGROUND OF THE INVENTION

1. Field of the Invention

The present invention relates generally to a changeover valve system having a cross drive member and, more specifically, to a suitable and efficient three-way, changeover valve system that is adapted to be mounted on a pressurized piping system. The changeover valve system of the present invention is mounted on a single pipe riser in the pressurized piping system and includes at least two independent pressure relieving devices such as, for example, pressure relief valves. The changeover valve system is adapted to permit the transfer of the active pressure relieving function from one pressure relieving device to the other pressure relieving device during operation of the pressurized piping system using the cross drive member without jeopardizing the pressure relieving capability of the pressurized piping system.

2. Description of the Prior Art

The prior art fails to specifically address either the problems or the solutions arrived upon by applicant. For example, Fetterolf Corporation has marketed a horizontal stem double-seated globe valve called a Ram-Seal Valve that provides a high pressure drop or resistance to flow. Due to its configuration, it is often necessary to use oversized valves to provide the required flow capacity. In addition, valves of this configuration have a large envelope size which limits their application.

In cases where a second changeover valve is connected to the outlets of the pressure relieving devices mounted on the first changeover valve in a tandem arrangement, there must be a simultaneous mechanical operation of the changeover valves in order to maintain the over pressure protection for the system.

With the Fetterolf and similar designs, it is difficult to coordinate the seating positions in a tandem arrangement and automation is difficult or impossible. Further, it is often difficult to seal long rising or multiple rotation stems.

One similar type valve is marketed by FEMA designated as Valvola di Scambio.

Anderson, Greenwood & Co. has marketed a changeover valve that utilizes a flat closure disc with a vertical "Y" type design. In such an arrangement, the valve stem must be driven down sufficiently to permit the disc to be rotated 180 degrees to the opposite seat and then retracted in an upward direction to close the disc to the seat. Such operation is complex and requires torque measuring devices to meet the manufacturer's operating specifications. The number of stem rotations required to raise and lower the disc and the 180 degree rotation required to change flow positions precludes the application of an integral manual operating handle.

Moreover, the multiple operations that are required (i.e., lowering, rotating and raising) effectively precludes remote actuation of a single valve and is even more complex in tandem applications.

Further, in such a design, the application of reverse pressurization to test the set pressure of the isolated pressure relief device tends to force the disc away from the seat and add loads to the operating mechanism. Therefore, it may not be possible to pressurize and test such pressure relieving devices in place when mounted.

Another example of a selector valve is described in U.S. Pat. No. 4,821,772 which issued on Apr. 18, 1989 to William L. Anderson, Jr., entitled Dual Active Selector Valve. The Anderson '772 patent describes the Anderson Greenwood valve previously discussed. In particular, it shows additional flow passages if more than one active pressure relieving device is desired.

Other examples of multiple outlet or shuttle valves include those described in U.S. Pat. No. 5,329,968 which issued on Jul. 19, 1994 to Walter W. Powell entitled Shuttle Valve and U.S. Pat. No. 4,403,626 which issued on Sep. 13, 1983 to Herman L. Paul, Jr. entitled Valve Assembly.

Examples of ball valves include those described in U.S. Pat. No. 5,251,663 which issued on Oct. 12, 1993 to Rollin C. Christianson et al. entitled High-Temperature, High-Pressure Oxygen Metering Valve; U.S. Pat. No. 4,915,133 which issued on Apr. 10, 1990 to C. L. Scott Harrison entitled Valve Device for Piping Systems; U.S. Pat. No. 4,881,718 which issued on Nov. 21, 1989 to Raymond P. Champagne entitled Ball Control Valve; U.S. Pat. No. 4,441,524 which issued to Hisayoshi Mese on Apr. 10, 1984 entitled Ball Valve; U.S. Pat. No. 4,203,572 which issued to Ronald D. Coffman on May 20, 1980 entitled Locking Ball Valve; U.S. Pat. No. 3,345,032 which issued on Oct. 3, 1967 to W. W. Rawstron entitled Three-Way Ball Valve; U.S. Pat. No. 3,537,473 which issued on Nov. 3, 1970 to David B. DeZurik, Jr. entitled Anti Slam Valve Positioning Means; U.S. Pat. No. 3,184,213 which issued on May 18, 1965 for Clifford E. Anderson entitled Seat For Top Entry Ball Valve; and U.S. Pat. No. 3,100,499 which issued on Aug. 13, 1963 to Harold E. Bass entitled Valve.

As will be appreciated, none of the valve systems heretofore described teach or suggest the use of a three-way, changeover valve that offers the unique advantages presented by the changeover valve system of the present invention.

SUMMARY OF THE INVENTION

Against the foregoing background, it is a primary object of the present invention to provide a pressure relieving changeover valve system that is adapted to be used in combination with a pressurized piping system.

It is another object of the present invention to provide such a changeover valve system of a partial ball-type configuration.

It is yet another object of the present invention to provide such a changeover valve system that is adapted to accommodate at least two pressure relieving devices.

It is still another object of the present invention to provide such a changeover valve system that is adapted to direct a single source of fluid to either of the pressure relieving devices.

It is another object of the present invention to provide such a changeover valve system with minimal flow resistance.

It is yet still another object of the present invention to provide such a changeover valve system that is adapted to permit one of the pressure relieving devices to be serviced without affecting the integrity of the over pressure relieving capability of the pressurized piping system.

It is yet another object of the present invention to provide such a changeover valve system that is operated by minimized rotational motion only.

It is but still another object of the present invention to provide such a changeover valve system that may include an integral and visible control handle for manually changing from one pressure relieving device to the other pressure relieving device during operation.

It is still another object of the present invention to provide such a changeover valve system that may be adapted to the use of geared actuators or powered actuators.

It is but another object of the present invention to provide such a changeover valve system that permits in situ adjustment of the set pressure of the installed isolated pressure relieving device.

It is but yet another object of the present invention to provide such a changeover valve system that includes means for balancing the pressure to minimize operating forces.

It is but still yet another object of the present invention to provide such a changeover valve system in which the inlet port is always connected to one of the outlet ports to achieve a fail-safe configuration.

It is yet still another object of the present invention to provide such a changeover valve system in which one may change from one pressure relieving device to another pressure relieving device without compromising the over pressure protection of the piping system during the changeover process.

It is but another object of the present invention to provide such a changeover valve system in which a cross drive member is used to effect movement of the changeover member.

To the accomplishments of the foregoing objects and advantages, the present invention, in brief summary, comprises a changeover valve system, having a cross drive member, that is adapted to be secured at one end to a riser from a pressurized piping system and at its opposite end to at least two pressure relieving devices. The changeover valve system includes a body and at least two elbows secured to the body to which are attached to at least one of the pressure relieving devices. A partially spherical changeover member is provided within the body having at least one inlet port adapted to communicate with the riser and at least one, but preferably two, outlet ports adapted to alternately communicate with each of the pressure relieving devices. Transport means including a cross drive member are further provided for effecting rotation of the changeover member within the body to permit the changeover member to travel from a first position in which the outlet port is in communication with one of said pressure relieving devices to a second position in which the outlet port is in communication with the other pressure relieving device. In intermediate positions between the first and second positions, the at least one outlet port always remains in communication with at least one of said pressure relieving devices. Locking means are provided for securing the changeover means in either of these two positions but not in any intermediate position.

BRIEF DESCRIPTION OF THE DRAWINGS

The foregoing and still other objects and advantages of the present invention will be more apparent from the detailed explanation of the preferred embodiments of the invention in connection with the accompanying drawings, wherein:

FIG. 1 is a perspective view of the changeover valve system of the present invention;

FIG. 2 is a top view of the changeover valve system of the present invention;

FIG. 3 is a sectional view taken along line 3—3 of FIG. 2;

FIG. 4 is a sectional view taken along line 4—4 of FIG. 2;

FIG. 5 is an enlarged top view of the partially spherical changeover member of the changeover valve system of the present invention;

FIG. 6 is an enlarged perspective view of the cross drive pin used for connecting the valve stem to the changeover member of the changeover valve system of the present invention;

FIG. 7 is a top view of the stop plate of the changeover valve system of the present invention;

FIG. 8 is a side view of the stop plate of FIG. 7;

FIG. 9 is a side sectional view of the handle assembly taken along line 9—9 of FIG. 2;

FIG. 10 is a side sectional view of handle assembly of the changeover valve system of the present invention;

FIG. 11 is a sectional view of the handle assembly taken along line 11—11 of FIG. 10;

FIG. 12A is a top view of the locking handle of the balance valve provided on the changeover valve system of the present invention;

FIG. 12B is a side sectional view of the locking handle of the balance valve taken along line 12B—12B of FIG. 12A;

FIG. 13 is a schematic illustration of the balance piping arrangement employed in the changeover valve system of the present invention;

FIG. 14 is an exploded perspective view illustrating the interaction of the cross drive member and the partially spherical changeover member of the changeover valve system of the present invention;

FIG. 15 is a top view illustrating the partially spherical changeover member with the cross drive member in a first position; and FIG. 16 is a top view of the partially spherical changeover member rotated to a second position.

BRIEF DESCRIPTION OF THE PREFERRED EMBODIMENTS

Referring to the drawings and, in particular, to FIG. 1 thereof, there is provided a ball-type changeover valve system referred to generally by reference numeral 10. The changeover valve 10 of the present invention is secured to a single riser 1 leading from a pressurized piping or conduit system (not shown).

The changeover valve 10 includes a body 12, a bonnet 13 affixed to the body 12 by bolts 4 and sealed by seal 47, a partially spherical changeover member 20, and at least two outwardly extending elbows 14. Each of these outwardly extending elbows 14 have a flange 16 at their outward ends to facilitate attachment of the changeover valve 10 to at least two pressure relieving devices (not shown). The subject changeover valve 10 may be used in conjunction with such pressure relieving devices as pressure relief valves or non-reclosing pressure relieving devices such as, for example, rupture discs.

It should be appreciated that the elbows 14 and flanges 16 may be welded or otherwise secured or attached to the changeover valve 10. Flow passageways 15 and 17 are provided within the elbows 14 and flanges 16 to permit communication between the riser 1 of the pressurized piping system and the pressure relieving devices.

During actual operation of the changeover valve 10, two pressure relieving devices are mounted on the valve flanges 16. The changeover valve 10 is similarly mounted to the riser 1 by means of a gasket surface and appropriate threaded bolt holes 3 (See FIG. 3) provided in the bonnet 13, or by welding a prepared surface of the bonnet 13 directly to the riser 1 or by other suitable mounting means.

As shown in greater detail in FIGS. 3–5, changeover member 20 is provided having a spherical outer surface 21. At least two outlet ports 22, 24 are provided in the changeover member 20 which communicate with a lower inflow port 25 at the bottom of the changeover member 20. The specific sizes and locations of the outlet ports 22, 24 are selected to dictate the amount of rotation that the changeover member 20 must travel from a first position in which one of the outlet ports 22,24 is aligned with one of the flow passageways 15,17 to a second position in which the other of the outlet ports is aligned with the other of the flow passageways. A recess 26 is also provided in the changeover member 20.

In actual operation of the changeover valve 10, at least one outlet port 22,24 is always in at least partial communication with at least one of the flow passageways 15,17 leading to a pressure relieving device. Thus, as the changeover valve 10 rotates from the first position to the second position, the flow from the piping system is diverted from one pressure relieving device to the other. At no time, however, are both outlet ports 22, 24 totally closed. Similarly, the inflow port 25 always remains in communication with the riser 1. Accordingly, at no time during the changeover operation is the pressure relieving capability of the pressurized piping system compromised and a fail-safe condition is achieved.

In a preferred embodiment, the amount of rotation required to changeover from one pressure relieving device to the other pressure relieving device is approximately 76 degrees although this may vary depending upon the application, the dimensions of the diameter of the flow passageways 15,17, and the diameter of the seat face contact on the changeover member 20.

As shown in greater detail in FIG. 3, the changeover member 20 is controllably loaded into a seat assembly 30, having a seat 32 which is sealed to seat carrier 31 by O-ring 33 with interposing spring 37 and O-ring carrier 35 is further sealed to seat carrier 31 by o-ring 34 and to body 12 by o-ring 36, by the load ring 40 that is threaded into the body of the valve through thrust washer 45. In a final assembled position, the load ring 40 is locked to the body 12 of the changeover valve 10 by set screw 46.

In a preferred embodiment, the seat assemblies 30 are fabricated as two-piece assemblies to provide a flexible, bi-lateral joint motion which insures that the separable seat 32 makes intimate contact and seals with the spherical surface of the changeover member 20. It will be appreciated that the seat assemblies 30 may be of multiple parts with non-metallic inserted seats 32, single piece seat assemblies with inserted non-metallic seat faces, or single piece metallic seats 32 virtually of any material including such non-metallic materials as carbon, graphite and ceramic as well as plastic materials. It will be appreciated that a one piece seat assembly may be used although such an assembly may not seal as well as the two-piece assembly. Final selection of materials and configurations will, of course, depend upon the specific application for the changeover valve 10.

When the changeover valve 10 is pressurized from either outlet flange 16 as would occur, for example, when adjusting the set pressure of a relief valve in place, the seat assemblies 30 are independent from the body 12 to enable the differential pressure to urge the seat 32 tightly against the spherical surface 21 of the changeover member 20. The springs 37 also aid in applying pressure against the seat 32 to effect a tighter seal. The seat assemblies 30 are specifically designed to have a multiplying piston effect on the seat load under such conditions. In other words, the piston area of the seat assemblies 30 is greater than the seat 32 contact area on the changeover member 20 and, therefore, the sealing pressure between the seat 32 and the surface of the changeover member 20 is always higher than the value of the pressure to be sealed.

The rotation or movement of the changeover member 20 from the first position to the second position is performed manually by manipulation of a handle assembly 70 provided at the top of the changeover valve 10. The handle assembly 70 is interconnected to the changeover member 20 by a valve stem 50 having a cross drive pin 54 provided at its end opposite the handle assembly which is adapted to engage a rectangular, matching recess 26 at the top of the changeover member 20 (see FIG. 4). This permits the changeover member 20 and the valve stem 50 to rotate on their respective centers. The valve stem 50 has an integral shoulder which bears on the stem bearing 52 and provides lateral support and prevents the valve stem 50 from blowing out of the assembly. The valve stem 50 is further sealed to the body 12 of the changeover valve 10 by packing or seals 60.

The handle assembly 70 attached to the valve stem 50 serves to facilitate the movement of the changeover member 20 between positions. By moving the handle assembly 70 from one position to another (as shown in FIG. 2), the changeover member 20 is able to function and rotate between the first and second positions, e.g., from a first position where one outlet port 22,24 communicates with one flow passageway 15,17 leading to one pressure relieving device to a second position where the other outlet port communicates with the other flow passageway leading to the other pressure relieving device. At no time during such changeover, however, are both outlet ports 22,24 completely closed which would compromise the piping systems over pressure relieving capability. It is only when the changeover is complete and the changeover member 20 assumes its second position that the first outlet port communicating with one pressure relieving device is completely closed and the second outlet port communicating with the second pressure relieving device is completely opened. In intermediate positions between the first and second position, each outlet port would be partially open.

As shown in greater detail in FIGS. 9–11, handle assembly 70 includes a tube 72 that is slidably engaged over a handle 73 so as to provide a longer lever arm when the tube 72 is extended from the handle 73 for facilitating valve actuation. When collapsed, the handle assembly 70 serves to enclose and therefore protect the handle nut 74 (See FIG. 4) to prevent access to and inadvertent removal of the handle assembly 70.

When the handle assembly 70 is collapsed, a locking lug 75 having a locking hole 87 integral to the sliding handle 72 comes into position over and mates with a complementary matching hole 88 in a stop plate 78 on which the handle assembly 70 operates and a complementary hole in the balance valve locking handle 86 and permits a locking device 80 such as a lock to be inserted through the complementary holes for securing the changeover member 20 into a fixed position. It will, of course, be appreciated that the locking device 80 may only be inserted when the valve handle assembly 70 is in a proper closed position thereby insuring that locking will only occur in either the first or second position where the changeover valve 10 is in full communication with either of the pressure relieving devices and not in any intermediate position where both outlet ports are partially open.

The stop pins 77 (see FIG. 2), which are adjustably secured to the stop plate 78, provide adjustable stops to limit the travel of the handle assembly 70. Further, when the locking handle 86 is collapsed, it engages the front stop pins 77 and locks the handle 86 in place thereby preventing inadvertent rotation.

The outer end of the tube 72 of the handle assembly 70 is painted (preferably bright red) and provides a highly visible indication of which pressure relieving device is active since the red outer tube 72 is designed to sit immediately under the active pressure relieving device.

It will be appreciated that in another embodiment of the present invention, the outer reduced section of the handle 73 may be painted (preferably green) and only becomes visible when the sliding tube 72 is in the fully collapsed position for locking with the locking device 80 and is not otherwise visible.

It may further be appreciated that a locking device 80 may, alternatively, be used through a pair of the complementary holes in the valve system to lock the changeover member 20 of the changeover valve 10 in a proper operating position.

Since the changeover member 20 is pre-loaded into the seat assembly 30 and is further urged therein by pressure when the changeover valve 10 is in either relief position, it should be appreciated that the operating torque necessary to move the changeover member 20 from one position to the other can be high. Accordingly, a balance valve 85 with valve handle 86 (see FIGS. 12A and 12B) is provided to balance the pressure above and below the changeover member 20 prior to operation of the changeover valve 10. In a preferred embodiment, the balance valve 85 is a simple ball valve that is operated by a balance valve handle 86 which includes an aperture 89 through which the locking device 80 may pass to engage and lock this handle 86. It should be noted that the configuration of the balance valve handle 86 is such that the valve system 10 of the present invention cannot be locked in either the first or second position by locking device 80 unless the balance valve handle 86 is in the proper position to close the communication of pressure between passageways 15. Aperture 89 on the balance valve handle 86 must be fully aligned with aperture 87 in the handle 70 and aperture 88 in locking plate 78 to permit the insertion of the locking element 80 through said apertures. This is only accomplished when the balance valve 85 is in such proper position to close communication of pressure between passageways 15. This is extremely important because if the balance valve 85 is not in such position to close communication of pressure between passageways 15, a potentially hazardous condition could occur. This features serves as a fail-safe feature of the present invention.

As shown in the schematic of the balance valve system in FIG. 13, the balance valve 85 is connected by a pipe or tube to flow passageways 15 of the valve system 10 above the seat assemblies 30. The normal direction of pressure is from the single port at the bottom of the changeover valve 10.

As a result of the utilization of this balance valve 85, it is possible to greatly reduce the torque required to operate the changeover valve system 10 by a simple hand lever or smaller and more economical geared or powered actuators when the balance valve 85 may, for example, be a solenoid operated valve. Without the use of such a balance valve system, it might not be possible to operate the valve system 10 by hand, in most applications.

Vent valves 110 are further provided communicating with the flow passageways 15. These vent valves 110 permit the pressure in the isolated flow passageway 15 to be vented prior to removal of the isolated relief valve. In addition, they serve as tell tales to walk up to and open to make sure that the changeover member 20 has seated properly beneath the isolated pressure relieving device. They also serve as a pressure relieving device pressurizing point for in situ testing.

The aforementioned configuration for this changeover valve 10 permits use in conjunction with at least two pressure relieving devices so as to provide for continuous process maintenance even though a pressure relieving device may leak and need to be replaced. This is done by: (1) unlocking the slidable tube 72 from the handle assembly 70, the balance valve locking handle 86 and the stop plate 78 and extending the slidable tube 72 from the assembly 70; (2) balancing the pressure in the valve system by operating the balance valve handle 86; (3) manipulating the handle assembly 70 from one position against one stop pin 77 to the opposite position against the opposite stop pin 77 thereby causing the changeover member 20 to rotate counterclockwise (or clockwise); (4) collapsing the handle assembly 70; (5) closing the balance valve 85; (6) re-inserting the locking device in the new position; and (7) venting the cavity above the isolated seat to the atmosphere by the appropriate vent valve 110.

The isolated pressure relieving device may then be removed and repaired or replaced in readiness for the next situation in which the active relieving device may require maintenance. This process may be repeated over and over without having to effect over pressure protection or stopping an operating process system.

FIGS. 14–16 illustrate in greater detail an alternative embodiment of the present invention which employs a novel cross drive member 200 having a top portion having an upper tenon 202 and a bottom portion having a lower tenon 204 in combination with a partially spherical changeover member 220. The lower tenon 204 of the cross drive member 200 is adapted to engage recess 226 in changeover member 220. An inherent problem relates to the transmission of rotary motion to the spherical changeover member 220 between the two positions of operation without restricting radial or axial motion between the valve stem and the closure member. This must be accomplished while providing as little lost motion or backlash as possible in the rotational plane to insure accurate seating positions at the limits of the rotational travel.

It has been found that by offsetting the upper tenon 202 of the top portion of the cross drive member 200 relative to the lower tenon 204 of the bottom portion as shown in FIGS. 14–16, transmission of rotary motion to the changeover member 220 is accomplished with minimal lost motion, minimum impact on the seating and minimal leakage. In a preferred embodiment, the upper tenon 202 is offset up to 30 degrees from the perpendicular of the lower tenon 204. In a particularly preferred embodiment, the upper tenon 202 is offset approximately between 10 and 20 degrees from the perpendicular of the lower tenon 204 and preferably 14 degrees from its perpendicular.

As can be seen in FIGS. 15–16, the offset of the upper tenon 202 does not alter the relationship of the cross drive in its initial seating position as shown in FIG. 15 where port 224 is open When the changeover member 220 is rotated approximately 76 degrees clockwise to a second position as shown in FIG. 16 in which port 222 is open, the top portion of the cross drive sliding in the stem slot provides direct radial motion of the closure member to the seat and, therefore, the seat load bias previously described is removed. This has been found to minimize valve leakage problems

Having thus described the invention with particular reference to the preferred forms thereof, it will be obvious that various changes and modifications can be made therein without departing from the spirit and scope of the present invention as defined by the appended claims.

Wherefore, I claim:

1. A changeover valve system adapted to be secured at one end to a riser from a pressurized piping system and at its opposite end to at least two pressure relieving devices, said system including:

a body;

at least two outlets secured to said body, each of said outlets being attached to a pressure relieving device;

a partially spherical changeover member provided within said body, said changeover member having at least one inlet port adapted to communicate with said riser and at least one outlet port adapted to alternately communicate with each of said pressure relieving devices; and means for rotating said changeover member within said body so as to cause said changeover member to move from a first position in which said at least one outlet port is in communication with one of said pressure relieving devices to a second position in which said at least one outlet port is in communication with said other pressure relieving device, wherein said mean for rotating includes a cross drive member for engaging said changeover member.

2. The changeover valve system of claim 1, wherein said cross drive member includes a top portion having an upper tenon for engaging said means for rotating and a bottom portion having a lower tenon for engaging said changeover member.

3. The changeover valve system of claim 2, wherein the longitudinal orientation of said upper tenon is offset by up to about 30 degrees from the perpendicular of said lower tenon.

4. The changeover valve system of claim 3, wherein the longitudinal orientation of said upper tenon is offset by between about 10 degrees and about 20 degrees from the perpendicular of said lower tenon.

5. The changeover valve system of claim 1, further including a balance valve for balancing the pressure above and below the changeover member prior to operation of the changeover valve.

6. The changeover valve system of claim 5, wherein said balance valve includes a balance valve locking lever handle.

7. A changeover valve system adapted to be secured at one end to a riser from a pressurized piping system and at its opposite end to at least two pressure relieving devices, said system including:

a body;

at least two outlets secured to said body, each of said outlets being attached to a pressure relieving device;

a partially spherical changeover member provided within said body, said changeover member having at least one inlet port adapted to communicate with said riser and at least one outlet port adapted to alternately communicate with each of said pressure relieving devices, said changeover member being adapted to rotate from a first position in which one of said outlet ports is in communication with a pressure relieving device to a second position wherein said other outlet port is in communication with another pressure relieving device; and means for effecting rotation of said changeover member within said body so as to cause said changeover member to move from said first position to said second position, said means for effecting rotation including a cross drive member with a top portion having an upper tenon for engaging said means for rotating and a bottom portion having a lower tenon for engaging said changeover member, wherein the longitudinal orientation of said upper tenon is offset by up to about 30 degrees from the perpendicular of said lower tenon.

8. The changeover valve system of claim 7, wherein the longitudinal orientation of said upper tenon is offset by between about 10 degrees and about 20 degrees from the perpendicular of said lower tenon.

9. The changeover valve system of claim 7, further including a balance valve for balancing the pressure above and below the changeover member prior to operation of the changeover valve.

10. The changeover valve system of claim 9, wherein said balance valve includes a balance valve locking lever handle.

11. A changeover valve system adapted to be secured at one end to a riser from a pressurized piping system and at its opposite end to at least two pressure relieving devices, said system including:

a body;

at least two outlets secured to said body, each of said outlets being attached to a pressure relieving device;

a partially spherical changeover member provided within said body, said changeover member having at least one inlet port adapted to communicate with said riser and at least one outlet port adapted to alternately communicate with each of said pressure relieving devices, said changeover member being adapted to rotate from a first position in which one of said outlet ports is in communication with a pressure relieving device to a second position wherein said other outlet port is in communication with another pressure relieving device;

means for effecting rotation of said changeover member within said body so as to cause said changeover member to move from said first position to said second position, said means for effecting rotation including a cross drive member with a top portion having an upper tenon for engaging said means for rotating and a bottom portion having a lower tenon for engaging said changeover member, wherein the longitudinal orientation of said upper tenon is offset by up to about 30 degrees from the perpendicular of said lower tenon; and a balance valve for balancing the pressure above and below the changeover member prior to operation of the changeover valve.

12. The changeover valve system of claim 11, wherein the longitudinal orientation of said upper tenon is offset by between about 10 degrees and about 20 degrees from the perpendicular of said lower tenon.

13. The changeover valve system of claim 12, wherein said balance valve includes a balance valve locking lever handle.

14. A cross drive member for use in conjunction with a changeover valve system of the type having a body; at least two outlets secured to said body, each of said outlets being attached to a pressure relieving device; a partially spherical changeover member provided within said body; and means for effecting rotation of said changeover member within said body, wherein said cross drive member includes a top portion having an upper tenon for engaging said means for rotating and a bottom portion having a lower tenon for engaging said changeover member, wherein the longitudinal orientation of said upper tenon is offset by up to about 30 degrees from the perpendicular of said lower tenon.

15. The changeover valve system of claim 14, wherein the longitudinal orientation of said upper tenon is offset by between about 10 degrees and about 20 degrees from the perpendicular of said lower tenon.

16. The changeover valve system of claim 14, further including a balance valve for balancing the pressure above and below the changeover member prior to operation of the changeover valve.

17. The changeover valve system of claim 16, wherein said balance valve includes a balance valve locking lever handle.

* * * * *